(12) United States Patent
Karpenko

(10) Patent No.: US 10,532,539 B2
(45) Date of Patent: Jan. 14, 2020

(54) THERMAL AND MECHANICAL SHOCK RESISTANT LAMINATED METAL PLATE ASSEMBLY

(71) Applicant: Ford Global Technologies, LLC, Dearborn, MI (US)

(72) Inventor: Yuri Anatoly Karpenko, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 15/404,925

(22) Filed: Jan. 12, 2017

(65) Prior Publication Data

US 2018/0194110 A1     Jul. 12, 2018

(51) Int. Cl.

| B32B 15/18 | (2006.01) |
|---|---|
| B32B 15/02 | (2006.01) |
| B32B 15/01 | (2006.01) |
| B32B 5/02 | (2006.01) |
| B32B 3/26 | (2006.01) |
| B60G 7/00 | (2006.01) |
| F16D 55/00 | (2006.01) |
| F16D 65/04 | (2006.01) |
| B62D 25/00 | (2006.01) |

(52) U.S. Cl.
CPC .......... *B32B 15/011* (2013.01); *B32B 3/266* (2013.01); *B32B 5/028* (2013.01); *B32B 15/01* (2013.01); *B32B 15/02* (2013.01); *B32B 15/18* (2013.01); *B32B 2250/03* (2013.01); *B32B 2262/103* (2013.01); *B32B 2307/558* (2013.01); *B32B 2605/08* (2013.01); *B60G 7/001* (2013.01); *B60G 2206/10* (2013.01); *B60G 2206/11* (2013.01); *B60G 2206/722* (2013.01); *B60G 2206/724* (2013.01); *B62D 25/00* (2013.01); *F16D 65/04* (2013.01); *F16D 2055/0037* (2013.01)

(58) Field of Classification Search
None
See application file for complete search history.

(56) References Cited

U.S. PATENT DOCUMENTS

| 5,175,401 | A * | 12/1992 | Arcas | G10K 11/172 |
|---|---|---|---|---|
| | | | | 181/292 |
| 7,637,136 | B2 | 12/2009 | Horita et al. | |
| 2005/0006023 | A1 * | 1/2005 | Johnson | B29C 70/086 |
| | | | | 156/92 |
| 2005/0053765 | A1 * | 3/2005 | Albers | B29C 43/18 |
| | | | | 428/138 |
| 2011/0059291 | A1 * | 3/2011 | Boyce | C08J 5/00 |
| | | | | 428/136 |
| 2012/0128926 | A1 | 5/2012 | Ohishi et al. | |
| 2016/0097433 | A1 | 4/2016 | Karpenko et al. | |
| 2017/0355169 | A1 | 12/2017 | Sharon et al. | |

\* cited by examiner

*Primary Examiner* — Humera N Sheikh
*Assistant Examiner* — Xiaobei Wang
(74) *Attorney, Agent, or Firm* — Vichit Chea; Brooks Kushman, P.C.

(57) ABSTRACT

A plate assembly for a motor vehicle may include a first plate, a second arranged substantially parallel to the first plate, the second plate defining a plurality of perforations, and a mesh core including a plurality of wire bundles, the core arranged between the plates, wherein the mesh core is rigidly joined to an inner surface of each plate via the perforations.

10 Claims, 5 Drawing Sheets

US 10,532,539 B2

THERMAL AND MECHANICAL SHOCK RESISTANT LAMINATED METAL PLATE ASSEMBLY

TECHNICAL FIELD

Disclosed herein are thermal and mechanical shock resistant laminated metal plate assemblies.

BACKGROUND

In recent years, global warming concerns have increased, and in turn, so has the regulation of motor vehicle emissions of carbon dioxide ($CO_2$). In an effort to decrease the amount of carbon dioxide emissions, manufacturers have attempted to decreases vehicle weight. In one form, manufacturers have attempted to decrease the weight of metal plates typically used in vehicles. These plates must maintain certain strength and rigidity minimums, as well as be shock resistant.

SUMMARY

A plate assembly for a motor vehicle may include a first plate, a second arranged substantially parallel to the first plate, the second plate defining a plurality of perforations, and a mesh core including a plurality of wire bundles, the core arranged between the plates, wherein the mesh core is joined to an inner surface of each plate via the perforations.

A plate assembly for a motor vehicle may include a first plate, a second plate defining a plurality of perforations, and a mesh core arranged between the plates, wherein the mesh core is joined to an interior surface of each plate via the perforations.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a plate assembly for a motor vehicle that is light-weight, highly rigid and shock resistant, and combines workability for shearing, bending, deep-drawing, and extending, etc. Additionally, the plate assembly may withstand long lasting exposure to temperatures above 250 degrees Celsius without realizing any degradation in its elastic properties. The plate assembly may decrease the overall weight of the vehicle, thus reducing possible carbon dioxide emissions.

The plate assembly may be used for various automobile parts, e.g., body structural panels (body dash and cowl panels, underbody panels, and body side panels), suspension (subframes, stamped control and trailing arms), brake parts (shoeplates and dustshields), etc.

Figure 1:
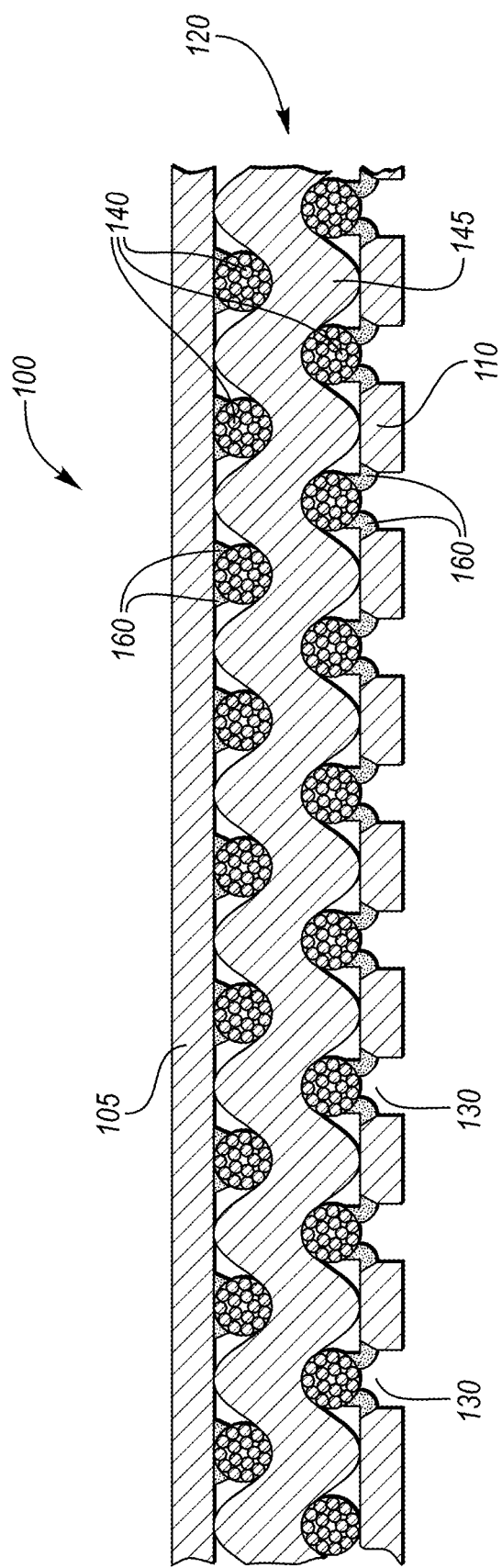
FIG. 1 illustrates a cross-sectional view of a plate assembly.

FIG. 1 illustrates a cross-sectional view of a laminated plate assembly 100. The plate assembly 100 may include a first plate 105 and a second plate 110 arranged substantially parallel to the first plate 105. The first and second plates 105, 110 may be metal plates. In one example, the first and second plates 105, 110 may be laminated metal plates where metal plates are laminated on both faces with the solid core layer made of the different metal type. The laminated plate may be made of thin layers of materials bonded together to produce a plate with characteristics different from the individual layers. In another example the plates 105, 110 may be formed of several layers of different types of steel. The layers may be forged together to form a panel of metal. In one example, the plates 105, 110 may include a core made of a first metal and a cover on each side of the core made of a second metal.

The first plate 105 may form a solid surface (e.g., a laminated metal plate) and may be also referred to as the top plate 105, laminated top plate 105, or metal top plate 105. The second plate 110 may be referred to as the bottom plate 110, laminated bottom plate 110, or metal bottom plate 110, and may be formed of a similar solid surface with similar properties as the first plate 105. The second plate 110 may define a plurality of perforations 130 to allow access to a mesh core 120 arranged between the first plate 105 and the second plate 110.

The mesh core 120 may be formed by one or more metal wire bundles 140, 145. For example, the wire bundles may be formed of high strength steel wire. The wire bundles may include two or more types of wire bundles. In one example, the wire bundles may include first wire bundles 140 and second wire bundles 145. In the example shown in FIG. 1, the first wire bundles 140 may include transverse bundles and the second wire bundles 145 may include longitudinal bundles. Each bundle 140, 145 may include one or more wires that run in a certain direction. As explained, the example of FIG. 1 may include a core 120 having first wire bundles 140 extending transversely, and second wire bundles 145 extending longitudinally.

The bundles 140, 145 may include one or more wires of varying diameters. The diameters may range from 0.15-0.40 mm. The bundles 140, 145 may together form the core 120 so as to provide a rigid structure for the plate assembly 100. The core 120 may form a pattern developed using a finite element method (FEM) to determine the most optimized pattern for manufacturing and usage based on a particular application of the mesh core 120. The FEM method may ensure long lasting parts configured to maintain their properties in view of exposure of the laminated metal plates 105, 110 at temperatures above 250 degrees Celsius without any degradation in the elastic properties. The FEM method may also ensure light-weight, high rigidity, high shock resistance, workability, and shape stability for the parts by optimizing the tensile strength of the wires and their diameters. In addition, the use of the wire bundles 140, 145 ensures excellent damping performance of the resulting laminated metal plate due to the interwire friction between the individual wires in the wire bundles 140, 145.

While the mesh core 120 is shown as being formed of the first and second wire bundles 140, 145, additional bundles may be included. While the first and second wire bundles 140, 145 are shown as extending in horizontal and vertical directions, one or more bundles may be included in addition to the first and second bundles 140, 145. These additional bundles are not shown in FIG. 2 but may be similar to the example arrangements of FIGS. 5A-F. The additional bundles may be added in the oblique direction with respect to the first and second wire bundles 140, 145. The oblique direction may be determined using FEM. Further, such layers and the direction of the bundles may be shifted with respect to each other in both the vertical, horizontal and oblique directions to optimize the overall structure weight and cost efficiencies. In some examples, anywhere from 2 to 20 different wire bundles may layered to build the mesh core 120. Each of the bundles may be joined via solid phase joining, including welding and weaving.

The mesh core 120 may be jointed with the plates 105, 110 at various joints 160. The joints may be located where the mesh core 120 is joined with an inner surface of the plates 105, 110. Such joints 160 may be solid phase spot joints and may be performed via welding, adhesion joining, and braze joining, etc. The joints 160 may be arranged sporadically or at fixed intervals at the plates 105, 110. For example, a joint 160 may be arranged at every other intersection of the first wire bundles 140 and the second wire bundles 145.

Figure 2:
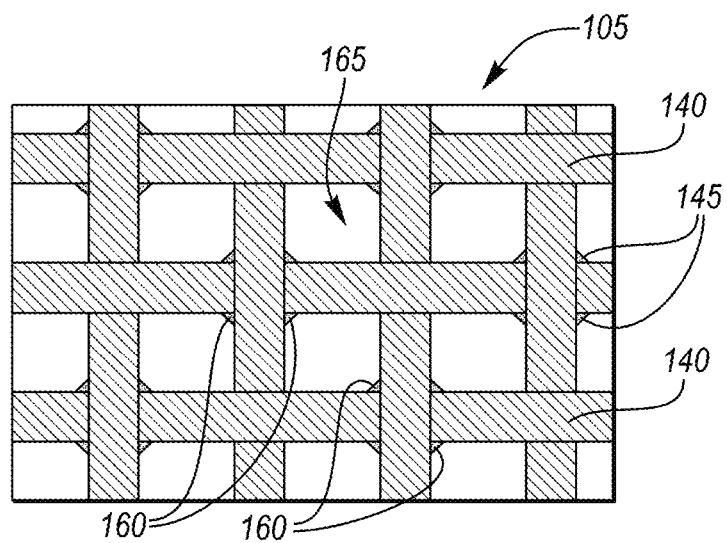
FIG. 2 illustrates an inner surface of a top plate of the plate assembly of FIG. 1.

FIG. 2 illustrates an inner surface 165 of the top plate 105 of the plate assembly 100 of FIG. 1. The first wire bundles 140 are shown as running perpendicular to the second wire bundles 145 forming a grid-like arrangement. The joints 160 may be arranged in a pattern at alternating intersections of the first wire bundles 140 and second wire bundles 145. Each joint may adhere the bundles 140, 145 to the inner surface 165 of the top plate 105. The pattern may provide for one or more joints 160 at an intersection. In the example shown in FIG. 2, four joints 160, one at each corner of the intersection, are illustrated.

Figure 3:
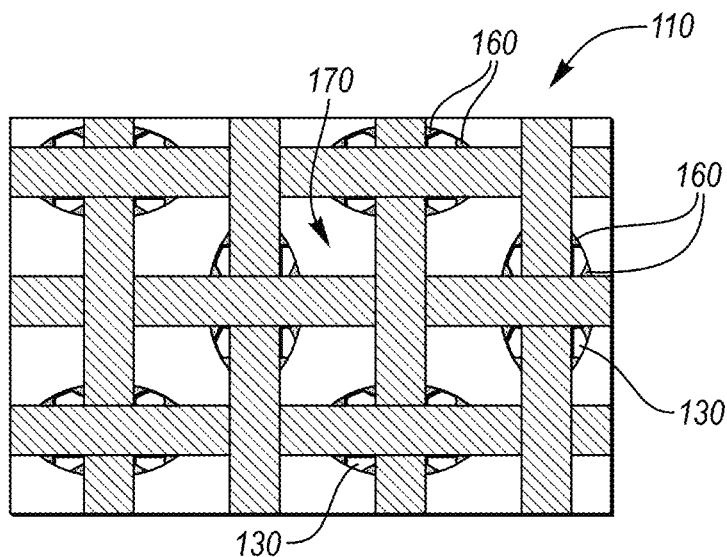
FIG. 3 illustrates an inner surface of a bottom plate of the plate assembly of FIG. 1.

FIG. 3 illustrates an inner surface 170 of the bottom plate 110 of the plate assembly 100 of FIG. 1. Similar to FIG. 2, the inner surface 170 of the bottom plate 110 may include various joints 160 for adhesion of the bundles 140, 145 to the bottom plate 110. The joints 160 may be arranged at the intersections of the bundles 140, 145, but may also be arranged anywhere along the wire bundles 140, 145 to adhere the core 120 to the bottom plate 110. In the example shown in FIG. 3, eight joints 160 may be arranged at an intersection.

The bottom plate 110, as explained above, may define a plurality of perforations 130 to allow access to a mesh core 120. The perforations 130 may allow for tools and other items to reach the inner surfaces of the top plate 105 and bottom plate 110 to join the core 120 to the plates 105, 110. The size of the perforations 130 may be large enough to allow for the tools to reach the inner surfaces 165, 170 of the plates 105, 110, but small enough so as not to affect the rigidity and other properties of the plate assembly 100.

The perforations 130 may be defined by a pattern at the bottom plate 110. Generally, but not necessarily, the perforations 130 may be arranged at the same intersection as the joints 160. That is, the joints 160 may be placed around the perforations 130. Creating joints 160 at or near the perforations 130 may be practical in that the tools inserted through the perforations may more easily reach these locations than locations not in close proximity to the perforations 130. The perforations 130, as shown in FIG. 1, may be defined by the bottom plate 110. The top plate 105 may not define any perforations as the perforations 130 defined by the bottom plate 110 may provide enough access to the inner surface 165 of the top plate 105. That is, a tool may extend through the perforations 130 defined by the bottom plate 110 and reach to the inner surface 165 of the top plate 105 to adhere the mesh core 120 to the top plate 105. This configuration of perforations 130 at only one of the plates 105, 110 decreases the amount of exposure to users, allows for additional weight reduction opportunities, as well as simplifies the manufacturing process, while not degrading the plate insulation properties from the external environment.

Figure 4:
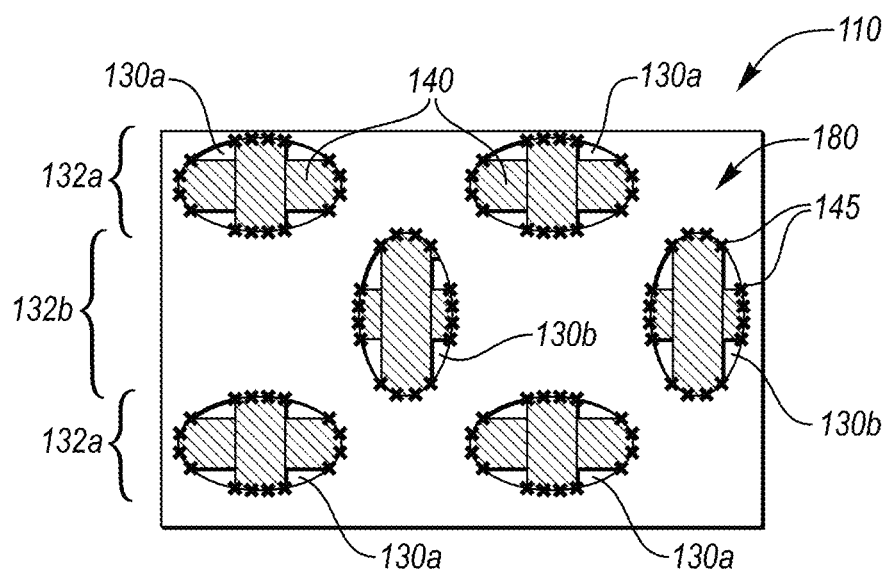
FIG. 4 illustrates an outer surface of the bottom plate of FIG. 3.

FIG. 4 illustrates an outer surface 180 of the bottom plate 110 of FIG. 3. The perforation 130 may define an oblong or oval shape and create a pattern of alternating the orientation of the perforations 130. In the example in FIG. 4, the perforations 130 may alternate between perforations 130a having a first orientation (e.g., a horizontal orientation) in a first row 132a, and perforations 130b having a second orientation (e.g., a vertical orientation) in a second row 132b. The first and second rows 132a, 132b may alternate with each other. The perforations may be spaced at a predefined distance from each other. The spacing of the horizontal perforations 130a may differ from the spacing of the vertical perforations 130b.

Since the layers of the laminated plate 100 must act as a unit to gain more strength, the size and spacing of these openings may be created so that the joints 160 that are contained within the openings can carry the shearing force acting between each adjacent layer. Thus, the size and spacing of the plate openings should comply with AISC (American Institute of Steel Construction) Specification, where e.g., AISC Specification J3.3 indicates that the preferred minimum distance(s) between the centers of openings is 3 times larger than the maximum dimension of the openings. The spacing may be determined based on FEM considering also the manufacturing constraints. For example, the perforations 130 shown in FIG. 4 have a periodic arrangement where their spacing has different wavelength in vertical and horizontal directions to minimize the possible heat buildup at the plate 100 and mesh core joints 160 during the plate manufacturing process.

Other orientations of the oblong perforations 130 may be included, as well as alternative patterns. By alternating the orientation of the perforations 130, the inner surface 170 of the bottom plate 110 may be adhered to the mesh core 120 at various attachment points (e.g., joints 160), thus increasing the strength of the attachment.

FIGS. 5A-F illustrate example coil assemblies and wire bundles 140, 145 for the mesh core 120. As explained, the wire bundles 140, 145 may include one bundle, or more than one bundle. The bundles 140, 145 may include various types of wire such as steel wire, etc. The wire may be arranged to form various patterns and layouts.

As explained above, the patterns used may be developed using a finite element analysis (FEM) to determine the most optimized pattern for manufacturing and usage based on a particular application of the mesh core 120. The FEM method may ensure long lasting parts configured to maintain their properties in view of exposure of the laminated metal plates 105, 110 at temperatures above 250 degrees Celsius without any degradation in the elastic properties. The FEM method may also ensure light-weight, high rigidity, high shock resistance, workability, and shape stability for the parts by optimizing the tensile strength of the wires and their diameters. The use of the wire bundles 140, 145 ensures excellent damping performance of the resulting metal plate due to the interwire friction between the individual wires in the wire bundles 140, 145.

Figure 5A:
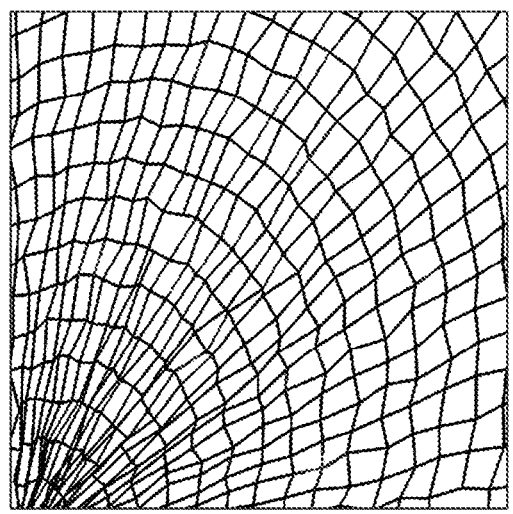
FIG. 5A illustrates example mesh core in a grid-like arrangement.

In one example, as shown in FIG. 5A, the mesh core 120 may form a grid-like arrangement, which helps to produce the laminated metal plate with isotropic properties.

Figure 5B:
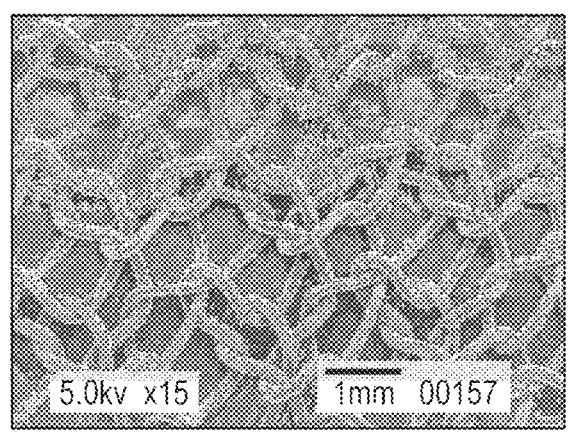
FIG. 5B illustrates an example mesh core in chain-like arrangement.
Figure 5C:
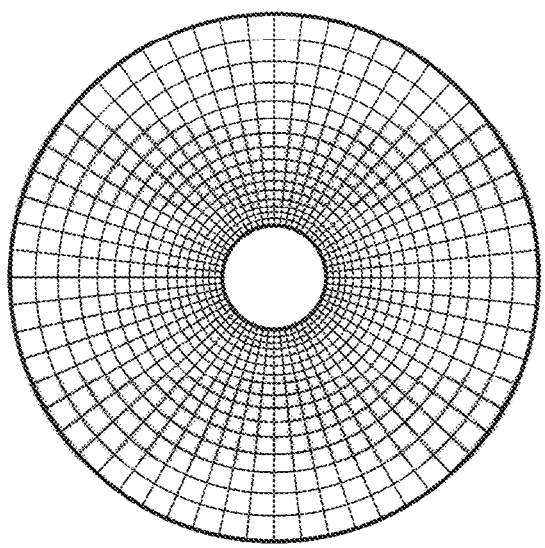
FIG. 5C illustrates an example mesh core in a circular grid arrangement.

In another example, as shown in FIG. 5B, the mesh core 120b may form a chain-like arrangement, for increasing inter-wire friction between the wire bundles In another example, as shown in FIG. 5C, the mesh core 120c may form a circular grid arrangement that can be used for the laminated metal plates of a circular shape with holes in the center.

Figure 5D:
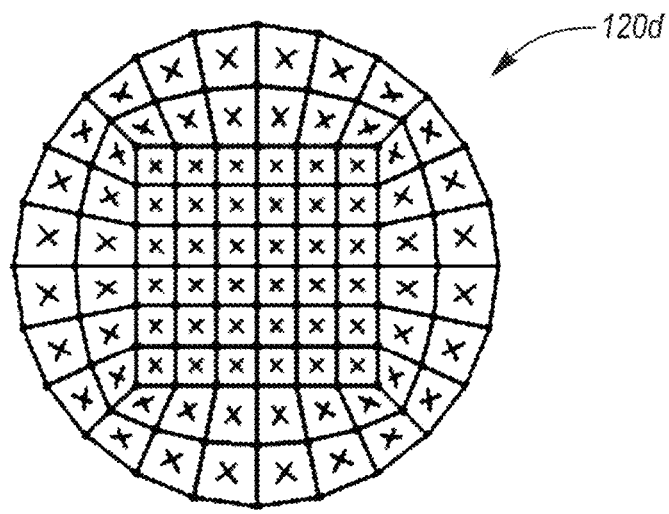
FIG. 5D illustrates an example mesh core in a hybrid grid arrangement.

In another example, as shown in FIG. 5D, the mesh core 120d may form a hybrid grid and circular arrangement that can help to simplify the manufacturing process of solid circular laminated metal plates.

Figure 5E:
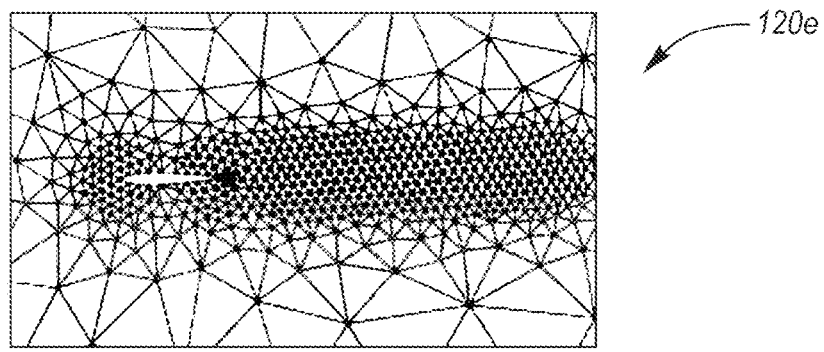
FIG. 5E illustrates an example mesh core in a high and low density arrangement.

In another example, as shown in FIG. 5E, the mesh core 120e may form a high and low density arrangement where the core 120e has a higher density of wire in the center of the mesh core 120 than on the outer periphery of the core 120e. Such an arrangement of the mesh core can be used when a local reinforcement of the laminated plate in certain areas is needed.

Figure 5F:
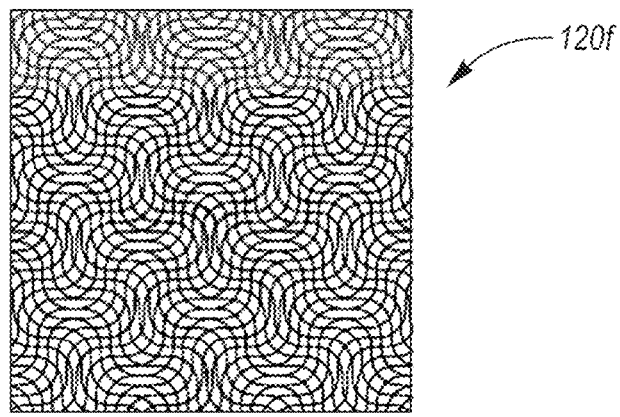
FIG. 5F illustrates an example mesh core in a repeating pattern.

In another example, as shown in FIG. 5F, the mesh core 120e may form a repeating pattern consistent across the mesh core 120e to increase the contribution of the mesh core to the overall strength and damping properties of the laminated metal plate.

The plate assembly 100 may be manufactured by weaving or knitting the wire bundles 140, 145 together. The wire bundles 140, 145 may also be joined together via solid-state joining (e.g., spot welding.). The mesh core 120 may be joined with the inner surface of the corresponding metal plate by solid phase spot joining (e.g., welding, adhesion joining, braze joining, welding, or the like). Such patterns for adhesion may be determined via the FEM method for optimal ease of manufacturing and structural durability. In order to allow for attachment of the uppermost portion of the mesh core 120 with the inner surface 165 of the first plate 105 and with the inner surface 180 of the second plate 110 via solid phase spot joining, the second plate 110 may define the perforations 130. As explained, the size and spacing of the perforations 130 may be optimized for manufacturing and the structural integrity of the resulting laminated plate using FEM. Thus, the spot joining of the plates 105, 110 and the upper most core layer of the mesh core 120 may be accomplished from the outside surface of the plates 105, 110 by following the contours of the perforations 130.

Figure 6:
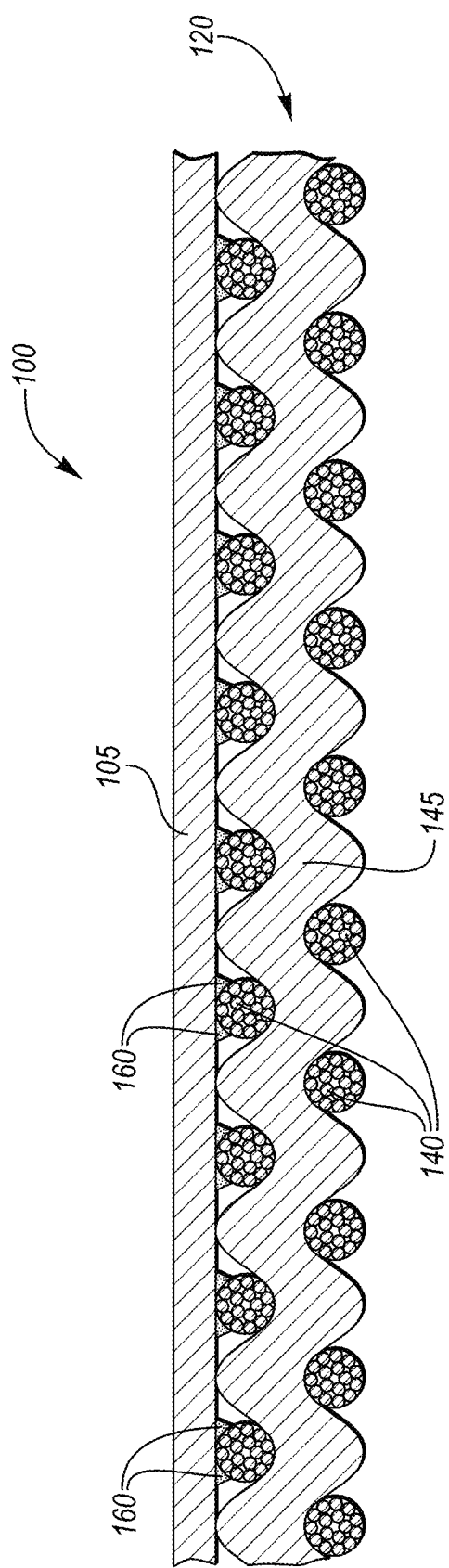
FIG. 6 illustrates a cross-sectional view of another plate assembly.

FIG. 6 illustrates a cross-sectional view of another laminated plate assembly 100 including the first plate 105 but not the second plate 110. The mesh core 120 may be formed by one or more metal wire bundles 140, 145, similar to those of FIG. 1. The mesh core 120 may be jointed with the first plate 105 at various joints 160. The joints may be located where the mesh core 120 is joined with an inner surface of the plates 105. As explained, such joints 160 may be solid phase spot joints and may be performed via welding, adhesion joining, and braze joining, etc. The joints 160 may be arranged sporadically or at fixed intervals at the plates 105, 110. For example, a joint 160 may be arranged at every other intersection of the first wire bundles 140 and the second wire bundles 145.

Accordingly, disclosed herein is a plate assembly for a motor vehicle that is light-weight, highly rigid, and shock resistant, and combines workability for shearing, bending, deep-drawing, and extending, etc. Additionally, the plate assembly may withstand long lasting exposure to temperatures above 250 degrees Celsius without realizing any degradation in its elastic properties. The plate assembly may decrease the overall weight of the vehicle, thus reducing possible carbon dioxide emissions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A plate assembly for a motor vehicle, comprising:
   a first plate,
   a second plate arranged substantially parallel to the first plate, the second plate defining a plurality of perforations, and
   a mesh core including a plurality of wire bundles, the mesh core arranged between the first and second plates, wherein the mesh core is rigidly joined to an inner surface of each plate only at joints exposed at the perforations, wherein the perforations are an oblong shape oriented in one of a first orientation and a second orientation perpendicular to the first orientation.

2. The plate assembly of claim 1, wherein the perforations having the first orientation are arranged in a plurality of first rows and the perforations having the second orientation are arranged in a plurality of second rows.

3. The plate assembly of claim 2, wherein the plurality of first and second rows alternate between each other.

4. The plate assembly of claim 1, wherein the perforations are spaced from each other at predefined distances.

5. The plate assembly of claim 1, wherein the perforations are configured to receive a tool capable of attaching the mesh core to an inner surface of at least one of the plates.

6. A plate assembly for a motor vehicle, comprising:
   a first plate,
   a second plate defining a plurality of perforations, and
   a mesh core arranged between the first and second plates, wherein the mesh core is joined to an interior surface of each plate at a joint exposed by the perforations, wherein the perforations are an oblong shape oriented in one of a first orientation and a second orientation, the second orientation being perpendicular to the first orientation.

7. The plate assembly of claim 6, wherein the perforations having a first orientation are arranged in a plurality of first rows and the perforations having a second orientation are arranged in a plurality of second rows.

8. The plate assembly of claim 7, wherein the plurality of first and second rows alternate between each other.

9. The plate assembly of claim 6, wherein the perforations are spaced from each other at predefined distances.

10. The plate assembly of claim 6, wherein the perforations are configured to receive a tool capable of attaching the mesh core to an inner surface of at least one of the plates.

\* \* \* \* \*